ized Patent Office
3,216,655
Patented Nov. 9, 1965

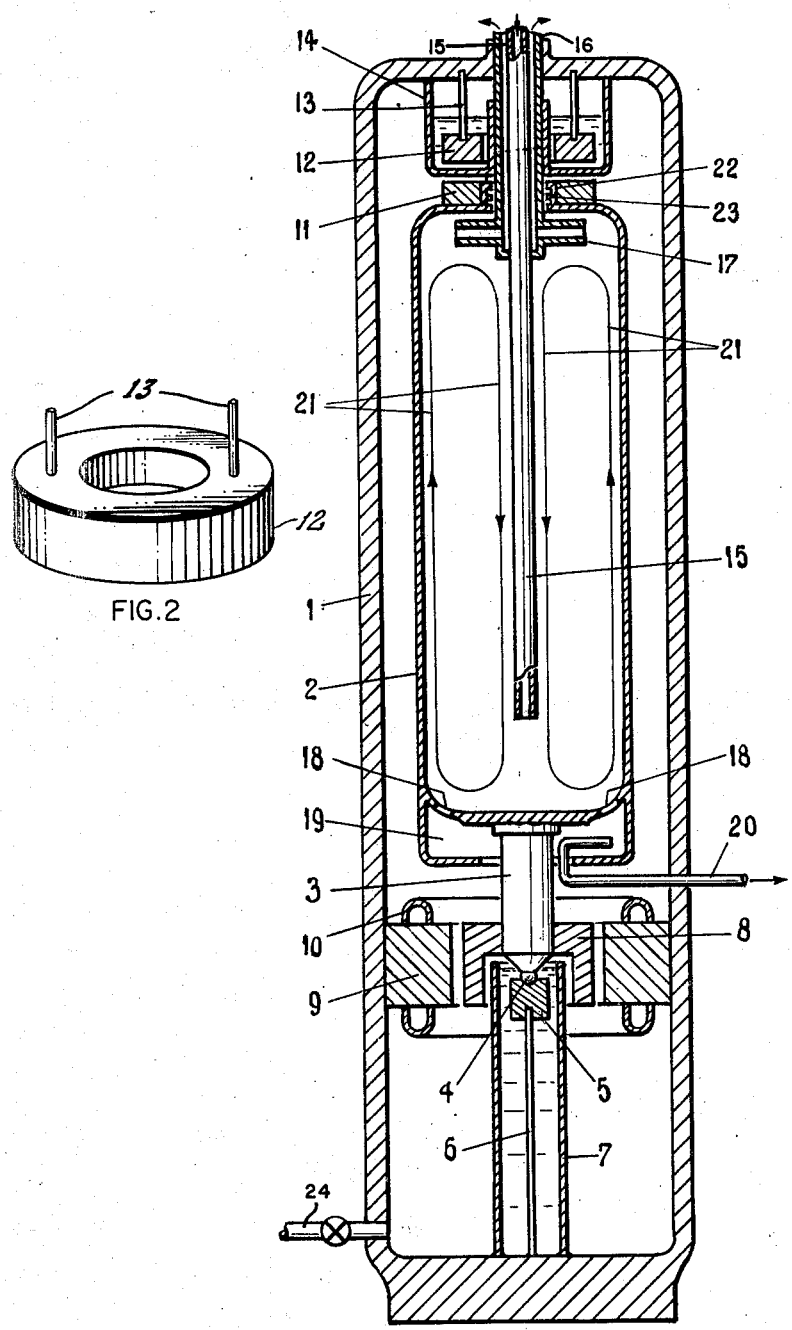

3,216,655
CONTINUOUSLY OPERATING ULTRA-CENTRIFUGES
Jaap Wind, De Ruyterlaan 40, Bussum, and Johannes Los, Joh. van der Waalsstraat 58 hs, Amsterdam, Netherlands
Filed Feb. 13, 1961, Ser. No. 88,862
Claims priority, application Netherlands, Dec. 27, 1957, 223,606
1 Claim. (Cl. 233—27)

The present invention relates to a continuously operating ultra-centrifuge for the separation of a gas mixture into two components, such as gaseous isotopes, as described in applicants' co-pending application, Ser. No. 782,004, filed Dec. 22, 1958, and now abandoned of which the present application is a continuation-in-part.

Various constructions and arrangements of ultra-centrifuges of this kind are already known, as for example shown in German Patent 833,487, U.S. Patent 2,551,815 and the book "Ueber Gaszentrifugen" of Beyerle, Groth, Harteck and Jensen. In these known ultra-centrifuges the relatively long tubular rotor drum is provided with axle bearings on both ends. A single axle bearing used on one end of the rotor only in normal ultra-centrifuges having a disc-shaped rotor cannot be used in the said ultra-centrifuges having oblong rotor drums, since the vibrations of the free end of the rotor drum cannot be damped. The axle-bearings on both ends of the known ultra-centrifuges introduce considerable difficulty. The cooperating surfaces and races of said bearings and the gas-tight seal thereof require very special and accurate constructions. In order to prevent friction losses the axles must have a small diameter. However the gas mixture to be separated and the separated components thereof will have to pass through said axles or shafts. This means that the supply and the discharge passages are very narrow, has the effect that the capacity of the centrifuge is reduced. Finally the rotor drums provided with axle bearings require a relatively large driving power which makes the operational cost of the centrifuges when used for industrial purposes high.

The invention has for an object to provide a continuously operating ultra-centrifuge in which the difficulties encountered with centrifuges having rotor drums provided with axle-bearings are partly or entirely avoided. The invention consists in the combination of the provision of a point bearing situated centrally beneath the drum rotor, one part of said bearing being attached to the outside of the drum bottom and the other part thereof forming a support for the rotor drum and being connected to the housing of the centrifuge. Said point bearing permits the rotor drum to rotate in the manner of a spinning top. A first body of magnetic material is connected to the top part of the rotor drum and a second body of magnetic material is mounted above said first body and is connected to said housing. An axial magnetic field is set up between the said two bodies of magnetic material and constitutes a means for holding the rotor drum in a vertical position, said magnetic field producing a resilient radial support for the rotor drum. Resilient and damping means is provided between the supporting part of the point bearing and the housing and between the second body of magnetic material and the housing. The resilient and damping means are constructed and arranged to permit the rotor drum to pass during its starting period the critical numbers of revolutions caused by the actions of said magnetic field and said supporting part of the point bearing and to continue to rotate with supercritical speed.

The rotor drum spinning as a top in a high vacuum develops very little friction. Consequently the power required for driving the drum is very small. Owing to the cooperation of the magnetic force, the point bearing and the damping means, vibrations at both ends of the rotor drum are sufficiently damped and a very light weight oblong rotor drum may be used which has, also at very high speed, sufficient stability. The bodies of magnetic material may be rings having a relatively large opening, so that very roomy tubes for conducting gas into and from the rotor drum may be passed through said rings. Such tubes have a large passage area for the gases and cause little friction to the gas flows.

It has already been proposed to suspend the rotor of an ultra-centrifuge in a magnetic field (U.S. Patents 2,256,937 and 2,733,857). However, these patents deal with intermittently operating ultra-centrifuges for medical, biological and chemical research, said centrifuges being provided with massive disc-shaped rotors. Such rotors are stable, since their axis of revolution coincides with the axis with respect to which the rotor has its maximum moment of inertia, so that a bearing and damping means on one end or side of the disc only suffice. It will be apparent that this is not so in centrifuges having an oblong tubular rotor drum of the type used in connection with the present invention. Such a rotor drum is unstable, since the two mentioned axes cross at right angles and the rotor drum will try to alter its rotation about its longitudinal axis by trying to rotate about the said axis of maximum inertia. This is why a tubular rotor drum must be supported and damped on either end in order to achieve stability.

A rotor supported by a point bearing and of which the weight is partly compensated by a magnet mounted near its upper end has already been used in a measuring instrument (British Patent 561,795). However, in such an instrument the rotor rotates relatively very slowly so that the influence of the rotational momentum on the system may be entirely neglected and said rotor has neither the tendency of the fast tubular rotor drum of the ultra-centrifuge to rotate about an axis at right angles with its longitudinal axis of rotation nor to operate in another way as a spinning top. Moreover, the rotor of the measuring instrument rotates with subcritical speed, so that the problems solved by the present invention do not occur therewith.

The invention will hereinafter be explained with the aid of the accompanying drawing wherein:

FIG. 1 is a sectional elevational view of an ultra-centrifuge according to the invention, and FIG. 2 shows in perspective a ring-shaped magnet of the centrifuge of FIG. 1.

In the drawing 1 is an oblong tubular housing in which a high vacuum is maintained. The vacuum is obtained by connecting the pipe 24 to a vacuum pump which is conventional and which is not shown. An oblong tubular rotary drum 2 is mounted for rotation about its longitudinal axis, so that the axis of the maximum moment inertia of the drum extends at right angles to the axis of rotation. The rotor drum 2 is supported by a point bearing of which the point member 3 is attached to the bottom of said drum and engages with its spherical lower end 4 a spherical recess of a supporting member 5, which supports the rotor drum standing on end and is connected to the housing 1 by means of a thin resilient vertical rod 6. The supporting member 5 and the rod 6 are situated within a tube 7 filled with liquid for damping the lateral or radial vibrations of said member 5. The rod, tube and liquid constitute resilient and damping means between the support 5 and the housing 1.

Mounted on the point member 3 is the rotor 8 of an electromotor for driving the rotor drum, of which motor the stationary part 9 carrying the winding 10 is connected to the housing 1.

Attached to the upper wall of the rotor drum is a ring-shaped permanent magnet 11 which is polarised in the axial direction. Above this magnet 11 is a second ring-shaped permanent magnet 12 which is also polarised in the axial direction and attracts the ring 11. The magnet field produced between the ring-shaped magnets 11, 12 acts not only axially to hold the rotor drum 2 in a vertical position, but also radially in a resilient manner at the upper end of the rotor drum. The magnet 12 is suspended from the housing 1 by means of thin resilient rods 13, which by virtue of their flexibility permit small displacements of said magnet in the radial direction. The magnet 12 and the rods 13 are shown in FIG. 2 in a perspective view. In order to damp the radial vibrations of the free upper end of the rotor drum 2 the magnet 12 and the rods 13 are immersed in liquid contained in a trough 14 connected inside the housing 1 to the upper wall thereof. The rods, trough and liquid constitute resilient and damping means between the magnet 12 and the housing 1.

The resilient support of the supporting member 5 and the resilient radial influence of the axial magnetic field cause critical numbers of revolutions. However due to the damping action of the liquid contained in the tube 7 and the trough 14 the rotor drum is able to pass these critical numbers of revolutions during its starting period without difficulty.

The mixture of gases or gaseous isotopes is supplied through a stationary inlet tube 15 having a comparatively large passage area. The heavier component of this mixture escapes through a stationary outlet tube 16 which is concentrically arranged around the tube 15 and which is in communication with transverse pipes 17 which open into the interior of drum 2. The outlet tube 16 has also a relatively large passage area. The lighter component is discharged from the drum through apertures 18 and collected in a chamber 19 provided on the lower end of the rotor drum 2. Said lighter component is discharged from said chamber 19 through a tube 20. In tubular rotor drums of the type referred to a gas whirl 21 of toroidal shape is generated which is of great assistance to the separation of the components and moves the heavier component upwards.

Provided between the upstanding rim 22 of the upper wall of the rotor drum 2 and the stationary outlet tube 16 is a frictionless gastight seal consisting of helical ribs 23 provided on the inner surface of said rim. Such a seal is known per se and need not be further explained.

What we claim is:

A continuously operating ultra-centrifuge for the separation of a gas mixture into two components, comprising an evacuated housing, an oblong tubular rotor drum mounted for rotation about a vertical axis in said housing, said drum including an end having an opening centrally thereof, at least one centrally positioned axially extending stationary tube passing through said central opening and into said drum, said tube being adapted to lead a gas mixture which is to be separated into the drum, means defining a discharge outlet adjacent one end of the drum and extending into said drum for receiving one component of the gas mixture and means defining another discharge outlet adjacent the other end of the drum and opening into said drum for receiving another component of the gas mixture, a thrust bearing situated centrally beneath the drum, one part of said bearing being attached to the drum and having the shape of a centrally positioned axially extending point including a spherically curved end face and the other part of said bearing constituting a supporting socket, having a recess corresponding to the spherically curved end face, connected to said housing, said thrust bearing permitting rotation and precession movement of the rotor drum, a first body of magnetic material connected to an uppermost portion of the rotor drum, a second body of magnetic material mounted above said first body and connected to said housing, at least one of said bodies being an axially polarized magnet magnetically attracting the other body to hold the rotor drum in a vertical position and to permit resilient radial movement of the top of the rotor drum with respect to the axis of the housing, resilient and damping means between the socket of the thrust bearing and the housing, and resilient and damping means between the second body of magnetic material and the housing, both said resilient and damping means being operative to permit the rotor drum to pass during starting thereof a critical number of revolutions caused by the actions of the magnetic attraction between the two bodies of magnetic material and the supporting socket of the thrust bearing and to thereafter permit the drum to rotate at supercritical speed.

References Cited by the Examiner

UNITED STATES PATENTS

| 2,139,715 | 12/38 | Bergner | 233—1 |
| 2,256,937 | 9/41 | Beams et al. | |
| 2,551,815 | 5/51 | Schulz | 233—11 |
| 2,563,550 | 8/51 | Quist | 233—21 |
| 2,681,835 | 6/54 | Green | 308—10 |
| 2,733,857 | 2/56 | Beams | 233—24 |

FOREIGN PATENTS

| 833,487 | 3/52 | Germany. |
| 561,795 | 6/44 | Great Britain. |

OTHER REFERENCES

Beams: "The Ultracentrifuge," pub. in Science in Progress, Second Series, pp. 232–264, copyright 1940, by Yale University Press. A copy can be found in the scientific library or in division 22, class 233/1 (publications).

Beams: "A Tubular Vacuum-Type Centrifuge," Review of Scientific Instruments, vol. 9, December 1938, pp. 413–416. A copy can be found in division 32, class 233/1 (publications).

M. CARY NELSON, *Primary Examiner.*

HERBERT L. MARTIN, V. HARRY B. THORNTON,
*Examiners.*